July 16, 1963
R. L. MACY
3,097,572
SERVO CLUTCH
Filed Feb. 19, 1962
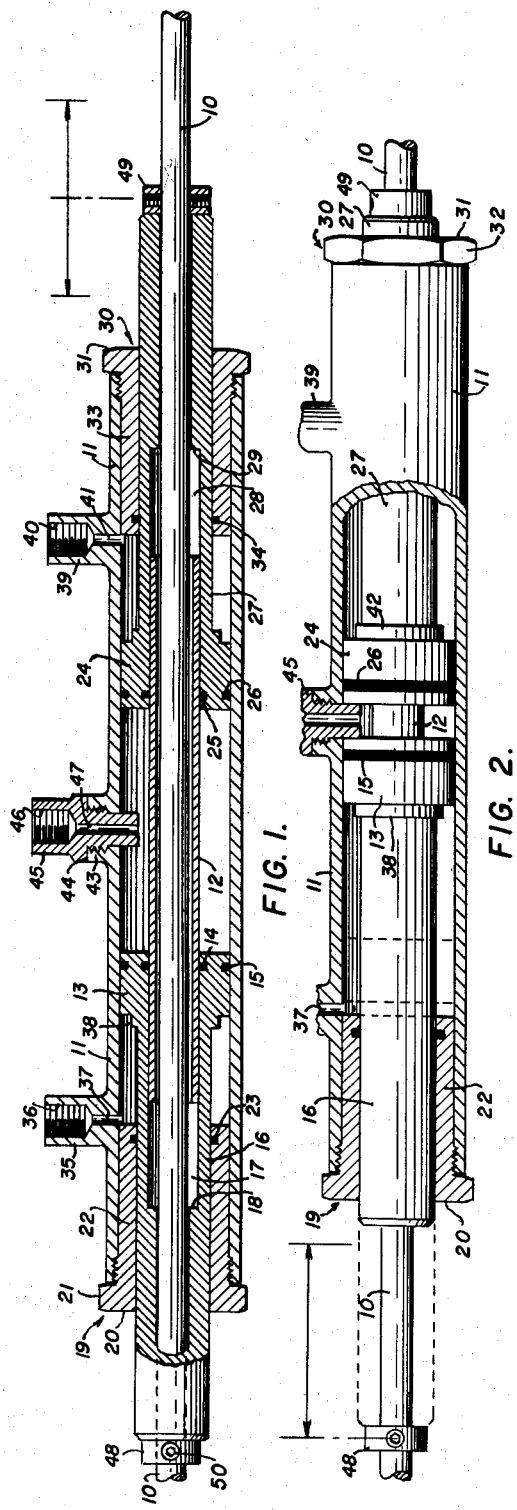
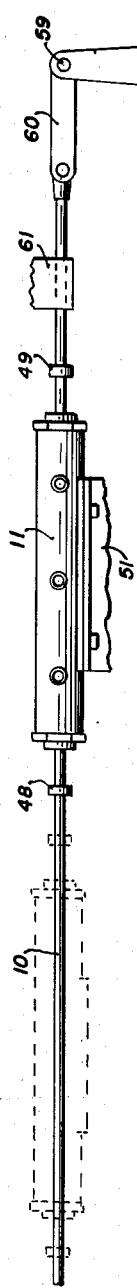
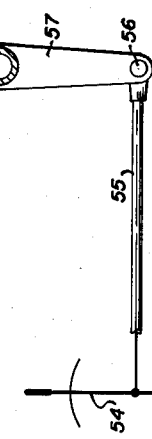
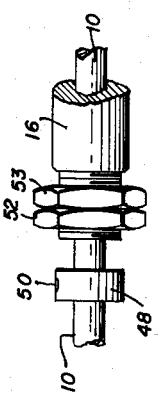
FIG. 1.
FIG. 2.
FIG. 3.
FIG. 4.
ROBERT L. MACY
INVENTOR
BY
*James Hurley Morgan*
ATTORNEY ated July 16, 1963

United States Patent Office 3,097,572
Patented July 16, 1963

3,097,572
SERVO CLUTCH
Robert L. Macy, 1017 E. Spurgeon, Fort Worth, Tex.
Filed Feb. 19, 1962, Ser. No. 174,226
4 Claims. (Cl. 92—13)

This invention relates to mechanical coupling devices for servo mechanisms and has particular reference to a combined clutch drive system for an automatic pilot of the type used to control aircraft during periods of unmanned flight.

Control surfaces of military and commercial aircraft may be intermittently operated by manual means or in mechanical response to the actuations of an automatic pilot which impresses programmed or gyro responsive forces upon flight control components as hydraulic pressures upon pistons mechanically linked to the control system. Generally, the manual and automatic systems are arranged in parallel with one system remaining passive while the other is utilized to maneuver the aircraft. In a system typical of those known heretofore, a double acting piston is hydraulically positioned within its cylinder to properly locate a control rod when the automatic pilot is being used; but, under manual control, the opposite ends of the cylinder containing the piston are communicated with one another through a bypass line which renders the automatic system passive.

Two major problems have caused difficulties in the operation of such systems. During manual operation the pilot must not only move the control rods to direct flight but must also displace the pistons of the now passive automatic system. Friction between pistons and their cylinder walls as well as resistance of the viscous flow of hydraulic fluid through the cylinders and bypass lines tend to make the controls sluggish in their manipulation as well as less responsive to aerodynamic forces acting upon control surfaces of the aircraft. In the transition from manual to automatic control such systems, unless provided with extraneous protective devices, present a latent safety hazard in the possibility that closure of the bypass line will result in a sudden hardover control command which may collapse components of the automatic system or structurally endanger the aircraft by a violent maneuver. To minimize the dangers in transitions between control systems, pressure sensing and regulating means have been incorporated into the hydraulic systems of automatic pilots and have yielded improvements in safety at a cost of increased complexity; intended safety of this type also penalizes the design and gives rise to new dangers in that the addition of a plurality of interdependent components, each susceptible to failure, lessens total reliability of the composite system so formed.

Accordingly, an object of the present invention is to provide a servo cluch for automatic pilots and which servo clutch presents minimal friction to manually controlled flight of an aircraft.

Another object of the invention is to provide a combined clutch and drive system capable of mechanically linking a servo device to a controlled linkage and wherein positive engagement between the servo device and the linkage may be intermittently accomplished or released.

A further object of the invention is to provide a servo clutch for an automatic pilot and which servo clutch permits continuous operation of the automatic pilot during flight without interference with manual operation of the aircraft when automatic control is not used.

Another object of the invention is to provide a pressure operated system capable of independently accomplishing engagement or disengagement between a servo device and the control linkage of an aircraft.

A particular object of the invention is to provide a servo clutch which inherently eliminates the danger of hardover maneuvers during the transition from manual to automatic control of an aircraft.

A like object of the invention is to provide a servo clutch which engages the control system of an aircraft at a safe rate.

A further object of the invention is to provide construction for a servo clutch which eliminates the need for extraneous or auxiliary sensing and correcting mechanisms.

An additional object of the invention is to provide a servo clutch capable of engaging the control system of an aircraft at a rate dependent upon the maneuver required to place the aircraft on the course selected by its automatic pilot.

These and other objects will become apparent from the following description and the accompanying drawing, wherein:

FIGURE 1 is a sectional and side elevational view of a servo clutch as defined herein.

FIGURE 2 is a partially sectional and fragmentary side elevational view of the components illustrated in FIGURE 1 and shows pistons of the invention displaced with respect to their positions as illustrated in FIGURE 1.

FIGURE 3 is a reduced plan view of the invention shown in relation to other elements of a control system, part of which is illustrated schematically.

FIGURE 4 is a fragmentary side elevational view of an alternate form of construction for component parts of the invention.

In the drawing, a rod 10 is positioned within and extends axially through a cylinder 11 which is greater in its interior diameter than the diameter of the rod but which is axially shorter than the rod, it being understood that opposite ends of the rod extend outwardly beyond the ends of the cylinder. The surface of the rod 10 need not be polished; in fact, a body non-circular in cross section or a flexible cable in tension may be used in place of the conventional solid control rod illustrated. A sleeve 12 of less axial length than the cylinder 11 is positioned about the rod 10 within the cylinder. The interior diameter of the sleeve 12 is slightly greater than the diameter of the rod 10 and the surface therein need not be polished. The exterior surface of the sleeve 12 is of consistent diameter, however, and is machined or ground to a regular and smooth finish.

By symmetrical construction some elements of the invention are identical with other elements and differ from their counterparts only in their orientation with respect to the longitudinal center of the cylinder 11; for purposes of identification those elements at one end of the cylinder will be designated "control" elements while their counterparts at the opposite end of the cylinder will be described as "countercontrol" elements.

A control piston 13 is constructed in cylindrical shape, having an outside diameter corresponding to the inside diameter of the cylinder 11, and an inside diameter corresponding to the outside diameter of the sleeve 12, and is positioned within the cylinder about a portion of the sleeve. Both the interior and exterior surfaces of the control piston 13 are polished and each is provided with an annular groove in which are seated interior and exterior piston rings 14 and 15, respectively. The interior piston ring 14 bears against and makes slidable sealing contact with the exterior surface of the sleeve 12; whereas, the exterior piston ring 15 bears against and makes slidable sealing contact with the interior surface of the cylinder 11. Constructed integrally with the control piston 13 and projecting coaxially with and outwardly of an end of the cylinder 11, a control casing 16 is constructed with a polished cylindrical surface of less diameter than the interior diameter of the cylinder. Part of the control casing 16 next adjacent the control piston 13 has a polished interior cylindrical surface corresponding in diameter to the exterior surface of the sleeve 12, but the remainder of the casing has an inside diameter corresponding to the inside diameter of the sleeve; hence, an annular cavity 17 is formed within the control piston 13 and part of the control casing 16, and a shoulder 18 formed at the location of the change of the interior diameter of the control casing comprises the base of the cavity. A tubular control cylinder head 19 is provided with a flange like cap 20 having wrench faces 21 about its periphery; the exterior diameter of the tubular main portion 22 of the control cylinder head corresponds to the interior diameter of the cylinder 11 and its interior diameter corresponds to the exterior diameter of the casing 16. A control cylinder head ring 23 is received within and seated by an annular groove in the interior surface of the control cylinder head 19 where the cylinder head ring bears against and makes slidable sealing contact with the exterior surface of the casing 16. The control cylinder head 19 is received within and threadedly engaged by an end of the cylinder 11.

In accordance with the stated symmetrical construction of the invention, a countercontrol piston 24 carrying an interior ring 25 which makes slidable sealing contact with the sleeve 12 and an exterior ring 26 which makes slidable sealing contact with the wall of the cylinder 11 has a countercontrol casing 27 extending coaxially with the countercontrol piston through the opposite or countercontrol end of the cylinder. The control casing 16 and the countercontrol casing 27 thus extend in opposite directions from their respective pistons 13 and 24 but are otherwise identically constructed, the latter having an annular cavity 28 running with the countercontrol piston 24 and extending into the casing 27 thereof where a shoulder 29 forms the base of the cavity. In like manner, a countercontrol cylinder head 30 includes a flange like cap 31 having wrench faces 32 about its periphery and includes a tubular body 33 which extends from the cap into the cylinder 11 and there carries a cylinder head ring 34 which bears against and makes slidable contact with the exterior surface of the countercontrol casing 27. The control cylinder head 19 and the countercontrol cylinder head 30 are, therefore, identically constructed and differ only in their orientations with respect to the cylinder 11; that is, the tubular portions 22 and 33, respectively, are threadedly engaged by and extend into opposite ends of the cylinder 11 toward one another.

A facing block 35 is exteriorly and integrally constructed on the wall of the cylinder 11 nearest to but spaced from the control end of the cylinder. A threaded socket 36 is formed within the facing block and a control port 37 extending through the wall of the cylinder 11 communicates the socket with the interior of the cylinder at the innermost termination of the cylinder head 19. An annular projection 38 formed about the control casing 16 at its junction with the control piston 13 is adapted to engage the inner end of the control cylinder head 19 and to space the same from the outermost face of the control piston 13 at the location of the control port 37. In identical construction, a countercontrol facing block 39 is integrally formed on the exterior surface of the cylinder 11 and contains a threaded socket 40 which is communicated by a countercontrol port 41 with the interior of the cylinder 11 at the innermost termination of the countercontrol cylinder head 30. An annular projection 42 is likewise formed on the countercontrol casing 27 at its junction with the countercontrol piston 24 with this shoulder constituting a spacer between the countercontrol cylinder head 30 and the countercontrol piston 24 interiorly of the countercontrol port 41. Spaced equidistantly from opposite ends of the cylinder 11 and positioned equidistantly between the control port 37 and the countercontrol port 41 a central facing block 43 is formed integrally with the cylinder 11, and a threaded socket 44 is formed therein. A threaded nipple 45 is received by the socket and projects interiorly of the cylinder 11. Another threaded socket 46 is formed within the outer end of the nipple 45 and an orifice 47 communicates the nipple socket 46 with the interior of the cylinder 11. The nipple 45 is constructed of heavy guage metal with strength to withstand great lateral pressure without deformation. Ring stops 48 and 49 are respectively positioned about the rod 10 at opposite sides of the cylinder 11 and are there secured to the rod in equally spaced relationships from the caps 20 and 31 of the control cylinder head and the countercontrol cylinder head 19 and 30. Set screws 50 may be used to secure the ring stops 48 and 49 to the rod 10. The cylinder 11 is attached to and supported by a mounting bracket 51 extending from structural members (not shown) stationary relative to the rod 10.

In an alternate form of construction as best illustrated in FIGURE 4, the outer ends of the control and countercontrol casings 16 and 27 are exteriorly threaded and a pair of locking nuts 52 and 53 are received by each casing and are tightened against one another exteriorly of the cylinder 11.

As shown schematically in FIGURE 3, a pilot's control 54 is pivotally connected to a primary rod 55 connected by a primary pivot 56 to one end of a beam 57 mounted on a post 58. A secondary pivot 59 connects the other end of the beam to a floating link 60 which is pivotally connected to the rod 10. A guide 61 is employed as an auxiliary support for the rod 10. It should be understood that the illustrated linkage translates only the bi-directional motion of a single control and that pumps, strainers, valves, hoses, and accumulators of the hydraulic system have been omitted from the illustration.

In operation, the invention is connected to hoses (not shown) which communicate the orifice 47 and ports 37 and 41 with sources of hydraulic or gaseous pressure regulated by the automatic pilot and the automatic pilot switch. Assuming that an aircraft is being piloted manually, the pressure at the orifice 47 is equal to or less than the pressures at the control port 37 and countercontrol port 41. It will be assumed that the automatic pilot is functioning in that a pressure differential adequate to move the rod in such a manner as would cause the aircraft to assume its preset course is being maintained at opposite ends of cylinder 13. Under such circumstances, the control and countercontrol pistons 13 and 24 are forced inwardly toward one another and about the nipple 45 within the cylinder 13; the pressure between the pistons is less than that in either end of the cylinder and the pistons assume the position shown in FIGURE 2. When the pilot switches in his automatic system, pressure greater than the maximum pressure delivered to either end of the cylinder 13 through the ports 37 and 41 is delivered through the orifice 47 into the space between the pistons 13 and 24. The diameter of the orifice is a critical feature of the invention and must be made small enough so that the rate of flow therethrough will prevent complete charging of the cylinder between the pistons in a time interval less than that required to make a safe turn of 180 degrees. Optimum diameter of the orifice 47 is dependent upon the fluids and working pressures used in the control system of a given aircraft but may be defined as the largest diameter capable of restricting flow of the fluid into the cylinder 11 between the pistons 13 and 24 to a volumetric rate which cannot fully displace the pistons in an interval of time less than that required for the aircraft to safely execute a maneuver reversing its direction of travel.

As fluid between the two pistons 13 and 24 displaces the pistons outwardly from the longitudinal center of the cylinder 13, the outer ends of the casings 16 and 27 engage the ring stops 48 and 49 and outward displacement of the pistons relative to one another is terminated. In this circumstance the pistons 13 and 24 are mechanically linked to the control rod 10 and the pressure difference at opposite ends of the cylinder 11 displaces the pistons and control rod as a unit. The annular projections 38 and 42 on each piston 13 and 24 spaces the piston from its cylinder head and prevents under-running and blocking from the ports 37 and 41 by the pistons when they are in their extended positions and the rod 10 is at a limit of displacement. When the controls are to be returned to manual operations the pressure is once again lowered within the central section of the cylinder. The working pressures within the ends of the cylinder, whether equal or unequal, force the pistons back toward the longitudinal center of the cylinder. In the form of the invention illustrated in FIGURES 1 and 2, inward travel of the pistons 13 and 24 is limited by the nipple 45 which projects into the cylinder 13 and obstructs the path of each of the pistons. In the alternate embodiment of the invention (illustrated in FIGURE 4) the locknuts 52 and 53 engage the caps 20 or 31 of the cylinder heads 19 or 30 and limit inward travel of the pistons 13 and 24 within the cylinder 11. Use of the locknuts 52 and 53 permits adjustment of the limit of inward travel of the pistons 13 and 24 and, hence, may be combined with adjustment of the stop rings 48 and 49 on the rod 10 to adjust limits for maximum displacement of the rod.

It should be noted that more than one servo clutch, as defined herein, can be used with a single rod or control linkage. When a second servo clutch is added to the system, as illustrated by dotted lines in FIGURE 3, over command or priority command systems may be utilized to achieve a variety of results. In such an arrangement, the net result of a plurality of simultaneous commands is dependent upon the relative pressures utilized at the orifices and ports of the several mechanisms. Those skilled in the art will readily recognize that the described servo mechanism, whether employed singly or in unison with others, may be used in a variety of applications having no connection with the operation or control of aircraft.

The invention is not limited to the exemplary construction herein shown and described but may be made in various ways within the scope of the appended claims.

What is claimed is:

1. A servo clutch for longitudinal displacement of a rod, said servo clutch comprising: a cylinder coaxially receiving said rod through opposite ends of said cylinder, a sleeve loosely and slidably positioned about said rod within said cylinder, a first piston slidably positioned within said cylinder about said sleeve and in slidable sealed engagement with said sleeve, a first casing attached to and extending from said first piston about said sleeve and extending through one end of said cylinder, sealing means slidably receiving said first casing at one end of said cylinder, a second piston slidably positioned about said sleeve and in sealing contact therewith within said cylinder between said first piston and the other end of said cylinder, a second casing attached to and extending from said second piston about said sleeve and extending through said other end of said cylinder, sealing means slidably receiving said second casing at said other end of said cylinder, a first orifice communicating said first end of said cylinder with a fluid source, a second orifice communicating said other end of said cylinder with a fluid source, a third orifice communicating the interior of said cylinder between said pistons with a fluid source, and circumferential projections attached to said rod at positions exteriorly spaced from said ends of said cylinder.

2. The invention as defined in claim 1 and including a first shoulder spaced from said first piston, within said first casing and extending into the annulus between said first casing and said rod, a second shoulder spaced from said second piston within said second casing and extending into the annulus between said second casing and said rod, and means limiting the inward displacement of said pistons.

3. A servo clutch for engagement and longitudinal displacement of a rod, said servo clutch comprising: a cylinder coaxially receiving said rod through opposite ends of said cylinder, a first cylinder head threadedly engaging one end of said cylinder about said rod, a second cylinder head threadedly engaging the other end of said cylinder about said rod, a sleeve loosely and slidably positioned about said rod within said cylinder, a first piston slidably positioned within said cylinder about said sleeve and in slidable sealed engagement with said sleeve and in slidable sealed engagement with the interior wall of said cylinder, a first casing attached to and extending from said first piston about said sleeve and extending through said first cylinder head in sealing slidable engagement therewith, a second piston slidably positioned about said sleeve and in sealing contact therewith within said cylinder and in sealed slidable contact with the interior walls of said cylinder, a second casing attached to and extending from said second piston about said sleeve and extending through said other end of said cylinder in sealed slidable contact therewith, a first orifice communicating said first end of said cylinder with a fluid source, a second orifice communicating said other end of said cylinder with a fluid source, a third orifice communicating the interior of said cylinder between said pistons with a fluid source, and circumferential projections attached to said rod at positions exteriorly spaced from said ends of said cylinder.

4. The invention as defined in claim 3 and including: a locknut adjustably secured to said first casing exteriorly of said cylinder and a second locknut adjustably secured to said second casing exteriorly of said cylinder.

References Cited in the file of this patent

UNITED STATES PATENTS

| | | |
|---|---|---|
| 2,380,510 | Fitch | July 31, 1945 |
| 2,987,048 | Buxton et al. | June 6, 1961 |